INVENTOR.
ARTHUR T. CAPE
ATTORNEYS

United States Patent Office 3,285,769
Patented Nov. 15, 1966

3,285,769
METHOD OF APPLYING METAL COATING TO VALVES
Arthur T. Cape, Monterey, Calif., assignor to Coast Metals, Inc., Little Ferry, N.J., a corporation of Delaware
Filed July 20, 1962, Ser. No. 211,228
3 Claims. (Cl. 117—22)

This invention relates generally to a method of applying metal coatings to valves, but has reference more particularly to the application of layers or facings of protective heat and wear-resistant metal to the surfaces of valves, which, in use, are subjected to high temperatures and abrasive wear.

It has heretofore been common practice in the application of such layers or facings to valves to preheat the area to be coated to a welding temperature by means of gas flames, and to then progressively deposit the molten protective metal at a uniform rate upon successive portions of such area while rotating the valve, said protective metal being derived from the melting of welding rods. Such practice is disclosed, by way of example, in Wagner Patent No. 2,301,763.

It has also been proposed, as for example, in Isler Patent No. 2,726,165, to drop the protective metal, in powder form, onto a valve, and then heat the powdered metal by means of gas flames to cause it to become bonded to the seating surface of the valve. This method involves problems of metering the powdered metal, and of preventing the powdered metal from being displaced or blown away by the gas flames.

The present invention has, as its principal object, the provision of a method of utilizing a metal powder in the application of a layer or facing to the seating surface of a valve seat, to form a layer of the desired form and thickness, without involving the use of metering devices or gas flames.

Figure 1:
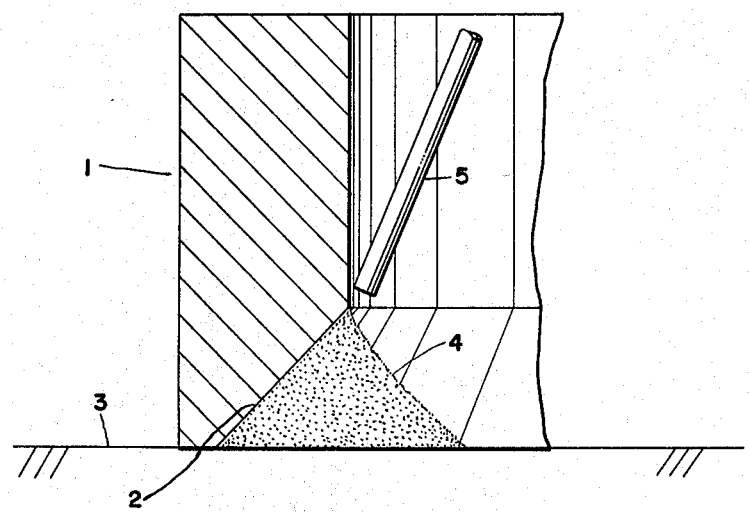
Figure 2:
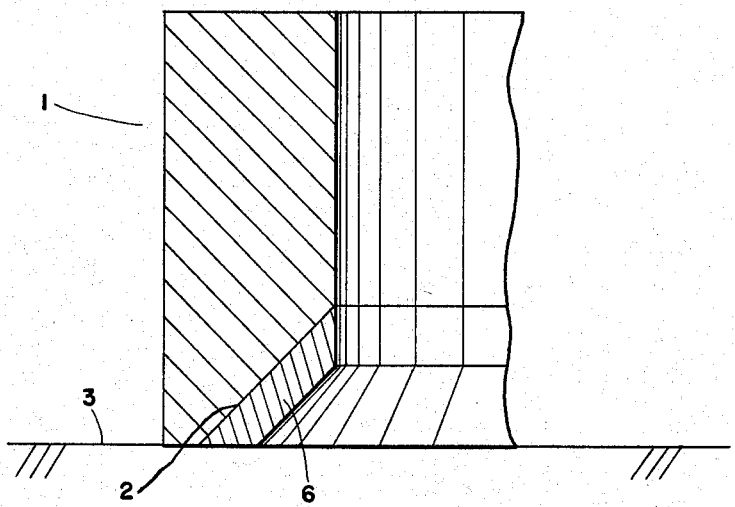

Other objects and advantages of the invention will become apparent in the course of the following description, taken in conjunction with the accompanying drawings, wherein FIG. 1 is a view illustrating more or less diagrammatically the first step in the method, and FIG. 2 is a similar view, illustrating the formation of the facing on the valve seat.

Referring more particularly to the drawings, reference numeral 1 denotes a portion of a valve seat, having a seating surface 2, which is to be provided with a facing or layer of a heat and wear-resistant metal, such, for example, as a nickel-base or cobalt-base alloy.

As a preliminary step, the valve seat 1 is placed on a flat supporting surface 3, of a refractory material, with the surface 2 facing the supporting surface 3.

The alloy, in the form of a coarse powder, is then preplaced or deposited on the surface 3, to form an annular mound or pile 4 of the powder, which lies adjacent the surface 2. The amount of powder which is required to form the facing or layer is determined experimentally, and the powder may be dropped in any desired manner, as through a tube 5, which is moved about the valve seat to form the annular pile.

An important and critical consideration is that the powder be in coarse form, that is to say, all of the powder must consist of particles of such size that not more than about 5% of the powder will pass through a 100-mesh screen. Under these conditions, the volume of the preplaced pile of powder is substantially twice that of the metal after it is melted.

After the power has been thus preplaced, it is important that the power be covered with a thin layer of silica, which may be provided either in the form of silica powder, or as a product derived, during the subsequent melting, from any organic chemical compound which decomposes under heat, to form silica, or which, when heated, reacts with oxygen to form silica. Among such compounds may be mentioned organic silicates, including ethyl silicate, silicones, silanes, etc.

The valve seat and powder are then heated, as in a furnace, at a temperature which may be as low as 2100° F., but is not in excess of about 2500° F., which causes the preplaced powder to be melted, and to bond readily to the surface 2 of the valve seat, to form a layer or facing of the approximate cross-sectional shape depicted in FIG. 2 by the reference numeral 6.

The temperature of heating will depend upon the metal of which the valve seat is composed and on the alloy of which the preplaced powder is composed.

It is difficult to explain how the preplaced powder, in melting, forms a layer of facing of the form shown in FIG. 2, but such formation is a direct result of a combination of the factors which have been described, including the coarsensess of the preplaced powder, the covering of the preplaced powder with a layer of silica, and the temperature of heating.

The invention is particularly adapted for the application of cobalt-base alloys such as disclosed in my copending application, Serial No. 119,835, filed June 27, 1961, now abandoned, but may be used generally for the application of other hard-facing alloys to valves. Among these may be mentioned nickel-base alloys of the type covered by A.M.S. specification Nos. 4,775, 4,776, 4,778 and 4,779, particularly those containing about 2% boron and about 3% silicon.

A great advantage of the method is that no core is used for holding the powdered metal or confining it during melting.

It will be understood that various changes may be made in the details of the method, as described, without departing from the spirit of the invention, or the scope of the appended claims.

Having thus described my invention, I claim:

1. The method of applying a metal coating to a valve seat, said method comprising the steps of positioning the valve seat with the surface to be coated facing in a downward direction and inclined to a solid support surface on which said valve seat is positioned, placing a predetermined quantity of a metal powder adjacent to and contacting said valve seat surface, said powder being of a mesh size such that not more than about 5% of the powder will pass through a 100-mesh screen, said powder being heaped in the angle defined by said inclined surface and said support surface, applying over said powder a layer consisting of a material selected from the group consisting of silica powder, organic chemical compounds which decompose under heat to form silica, and organic compounds which, when heated, react with oxygen to form silica, and heating the valve seat, and the powder to a high temperature sufficient to decompose said organic chemical compound when present, sufficient for oxygen to react with said organic compound when present and sufficient to cause the power to become melted and to become bonded, as a layer of approximately the desired cross-sectional form, to said valve seat surface.

2. The method, as defined in claim 1, wherein the powder is selected from the group consisting of nickel-base and cobalt-base alloys.

3. The method, as defined in claim 2, wherein the valve seat and powder are heated to a temperature within the range of from about 2100° F. to about 2500° F.

References Cited by the Examiner

UNITED STATES PATENTS

| | | | |
|---|---|---|---|
| 2,191,472 | 2/1940 | Hopkins et al. | 117—93 X |
| 2,301,763 | 11/1942 | Wagner | 118—47 X |
| 2,726,165 | 12/1955 | Isler | 117—18 |
| 3,015,880 | 1/1962 | Stephenson | 117—22 X |

ALFRED L. LEAVITT, *Primary Examiner.*

RICHARD D. NEVIUS, *Examiner.*

R. E. ZIMMERMAN, A. H. ROSENSTEIN,
*Assistant Examiners.*